CONTAINER STOPPERING APPARATUS

Original Filed Aug. 15, 1967 2 Sheets-Sheet 1

Leonard C. Costello
Karl H. Wiegmann
INVENTORS
BY Olivier Q. Olson
Agent

CONTAINER STOPPERING APPARATUS

Original Filed Aug. 15, 1967 2 Sheets-Sheet 2

Leonard C. Costello
Karl H. Wiegmann
INVENTORS
BY Oliver Q. Olson
Agent

United States Patent Office

Re. 28,085
Reissued July 30, 1974

28,085

CONTAINER STOPPERING APPARATUS

Leonard C. Costello, Warminster, and Karl H. Wiegmann, Huntingdon Valley, Pa., assignors to Hull Corporation, Hatboro, Pa.

Original No. 3,537,233, dated Nov. 3, 1970, Ser. No. 660,717, Aug. 15, 1967. Application for reissue Aug. 7, 1972, Ser. No. 278,183

Int. Cl. B30b *7/02;* B65b *7/28, 31/02*

U.S. Cl. 53—102 7 Claims

Matter enclosed in heavy brackets [ ] appears in the original patent but forms no part of this reissue specification; matter printed in italics indicates the additions made by reissue.

ABSTRACT OF THE DISCLOSURE

A housing adapted to be evacuated has top and bottom fluid pressure piston-cylinder units between which are positioned a plurality of shelves movable vertically relative to each other upon activation of the units. In one embodiment the shelves are interconnected by vertically slotted links, the top shelf being secured to the piston rod of the top piston-cylinder unit, with the lower shelves suspended therefrom. In another embodiment the shelves are interconnected by threaded bolts in place of the slotted links. In still another embodiment the shelves are supported in spaced apart relation resiliently by springs encircling guide rods.

BACKGROUND OF THE INVENTION

This invention relates to apparatus for stoppering containers, and more particularly to apparatus for stoppering containers in an evacuated or inert atmosphere.

Typical of apparatus of the class described provided heretofore includes a housing adapted to be evacuated and containing a plurality of vertically spaced shelves on which containers to be stoppered may be deposited. The shelves are movable vertically toward and away from each other by means of an hydraulic piston-cylinder unit underlying the housing with its reciprocative piston rod engaging the lowermost shelf. After the shelves are loaded with containers to be stoppered the piston-cylinder unit is actuated to extend the piston rod and move the lowermost shelf upward until the stoppers of the containers supported thereon engage the underside of the next upper shelf. That shelf thereupon is moved upward until the stoppers of the containers supported thereon engage the underside of the next upper shelf. This procedure continues until the stoppers on the containers supported on the uppermost shelf abut a fixed surface at the top of the housing, whereupon continued extension of the piston rod causes the stoppers to be pressed into the containers.

The primary disadvantage of prior apparatus of the type described resides in the requirement of an excessively long piston-cylinder unit to effect movement of a practicable number of shelves. The length of the piston-cylinder unit renders the apparatus difficult and costly to install, since it requires the provision of a pit of substantial depth below the housing.

Another disadvantage of prior apparatus of the type described resides in the complex structure by which the shelves are interconnected for proper spacing to accommodate loading while allowing upward movement of the shelves toward the next upper shelf to effect stoppering of the containers.

SUMMARY OF THE INVENTION

In its basic concept the apparatus of the present invention provides top and bottom extensible power units associated with a plurality of vertically spaced shelves mounted within a housing for movement toward and away from each other. By minimizing the length of the bottom power unit the entire apparatus may be mounted above floor level while still permitting convenient access to the shelves for loading and unloading. By the use of top and bottom power units the relative movements of shelves is reduced to a minimum, with corresponding reduction in wear of relatively movable parts.

It is by virtue of the foregoing construction that the principal objective of the present invention is achieved, namely to overcome the disadvantages of prior apparatus described hereinbefore.

Another important object of the present invention is the provision of container stoppering apparatus in which simplified and economical means is utilized for supporting the plurality of shelves in properly spaced apart relation for loading and unloading while permitting relative movement between shelves to effect container stoppering.

The foregoing and other objects and advantages of the present invention will appear from the following detailed description, taken in connection with the accompanying drawings of the preferred embodiments.

DESCRIPTION OF THE PREFERRED EMBODIMENTS

Figure 1:
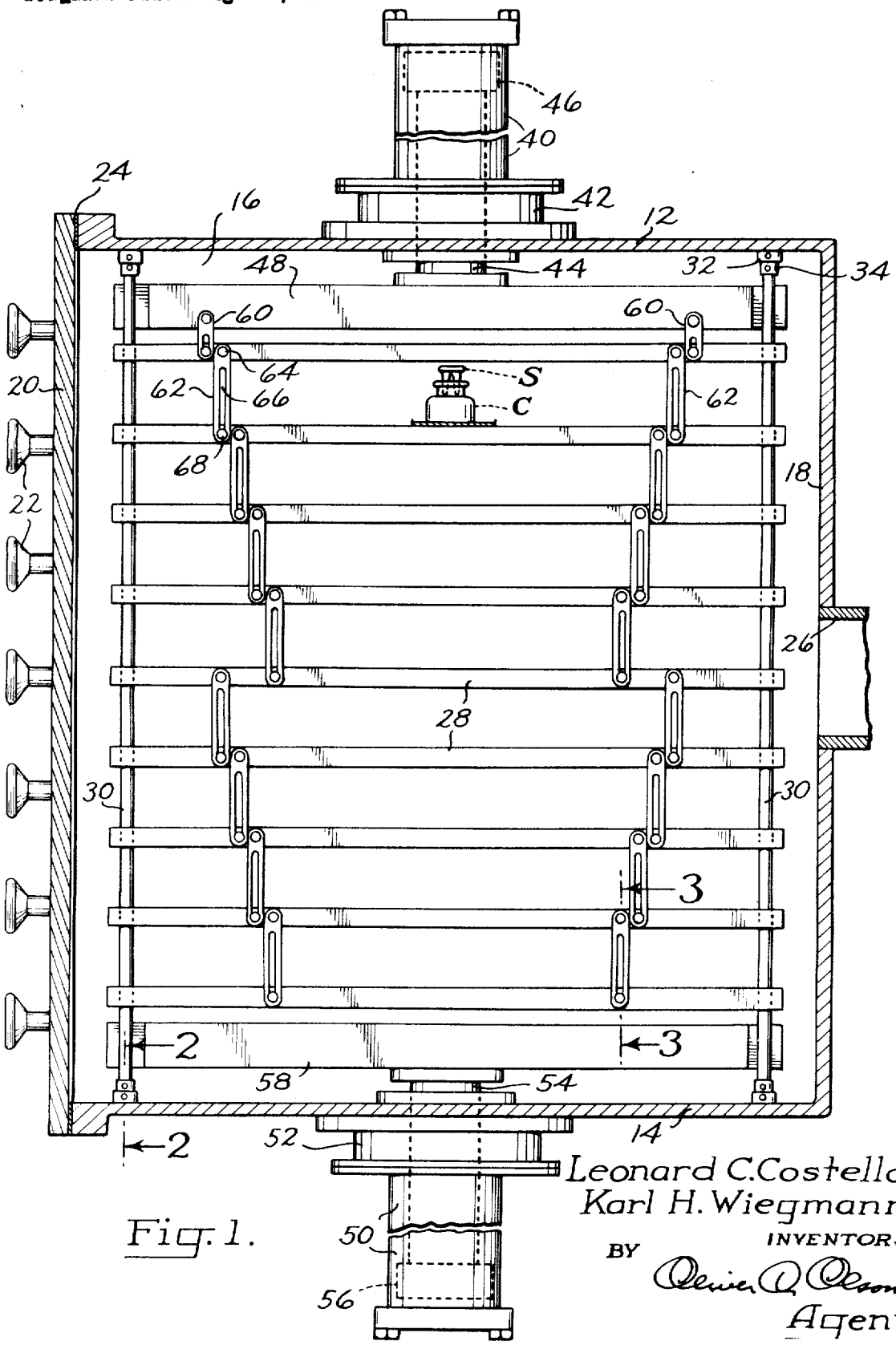
FIG. 1 is a foreshortened view in side elevation, partly in section, of container stoppering apparatus embodying the features of the present invention.

Referring particularly to FIG. 1 of the drawings the apparatus illustrated includes a housing having a top wall 12, a bottom wall 14, side walls 16, a rear wall 18 and a front door 20 removably closing front opening of the housing. The door is secured in closed position by such means as the peripheral pressure screws 22, and a peripheral gasket 24 is interposed between the housing and door to provide a vacuum tight seal. A conduit 26 communicating through the back wall of the housing may be connected to a vacuum pumping system or a source of inert gas, as desired, for the purpose of providing the interior of the housing with an evacuated or inert atmosphere.

The housing contains within it a plurality of vertically spaced horizontal shelves 28. In the embodiment illustrated the shelves are of generally rectangular configuration and are provided adjacent each corner with vertically aligned openings. Vertical guide rods 30 extend freely through these openings and serve to guide the shelves during their vertical movement, as described hereinafter.

The upper and lower ends of the rods are secured within the housing removably by means of the socket members 32 and couplings 34. The socket members are welded or otherwise firmly secured to the inner surfaces of the top and bottom walls of the housing. The rods are shorter than the distance between the facing ends of aligned socket members. The couplings are received slidably over the opposite ends of each rod and are adapted to seat in the socket members. A set screw 36 in the socket member is adapted to be tightened against the coupling, and a set screw 38 in the coupling is adapted to be tighted against the rod, whereby to secure the assembly within the housing.

The cylinder 40 of an extensible hydraulic piston-cylinder unit is mounted on the top wall of the housing by means of the interposed seal 42. A piston rod 44 attached to the piston 46 within the cylinder extends inward through the seal into the housing where it is secured to the top pressure plate 48. Hydraulic fluid under pressure is delivered from a source (not shown) selectively to opposite ends of the cylinder to effect reciprocation of the piston and vertical movement of the pressure plate.

In similar manner, the cylinder 50 of an extensible hydraulic piston cylinder unit is mounted on the bottom wall of the housing by means of the interposed seal 52. The piston rod 54 is secured to the piston 56 within the cylinder, extends inward through the seal and it attached to the bottom pressure plate 58. Hydraulic fluid under pressure is delivered selectively to opposite ends of the cylinder to effect reciprocation of the piston and corresponding vertical movement of the bottom pressure plate.

In the embodiment ilustrated in FIG. 1, the top shelf is secured to the top pressure plate by such means as the interconnecting links 60. The next lower shelf is suspended from the upper shelf by means of the laterally spaced links 62. Each of these links is secured to the shelf above by such means as the bolt 64. Below this bolt the link is provided with a vertically elongated slot 66 which slidably receives a bolt 68 projecting from the next lower plate. Bushings 70 are interposed between the bolts and links to insure free pivotal movement of the links as well as free movement of the bolt along the slot during vertical movement of the next lower shelf. The slot is closed at its bottom end and terminates at its upper end adjacent the underside of the top plate. Accordingly, the next lower plate is supported normally at its maximum spacing below the top plate as determined by the bottom end of the slot, and is movable upwardly into abutment with the underside of the top plate.

In similar manner each lower shelf is suspended from its adjacent upper shelf by means of laterally spaced links. The links are secured to adjacent shelves in offset relation (FIG. 1) to permit the shelves to move together, as will be understood.

The bottom shelf merely overlies the bottom pressure plate, and need not be secured thereto, since the assembly of plates is supported from the top pressure plate.

In the operation of the apparatus described hereinbefore, hydraulic fluid under pressure is delivered to the inner ends of the top and bottom cylinders to retract the piston rods and move the top and bottom pressure plates toward the top and bottom walls, respectively, of the housing. The plurality of shelves thus are suspended from the top pressure plate to their positions of maximum spacing. With the door removed, the shelves may be loaded with containers C to be stoppered. As is well known, each container is provided with a partially slotted or grooved stopper S which initially is only partially seated in the container opening to permit either evacuation or filling with inert gas, whichever is provided at the conduit 26. The door then is sealed and the housing evacuated or filled with inert gas, as desired.

Hydraulic fluid under pressure then is delivered simultaneously to the outer ends of both of the cylinders to effect simultaneous extension of the piston rods and movement of the top and bottom pressure plates toward each other. The shelves thus are moved successively toward each other and toward the center of the vertical assembly until the stoppers have been fully seated in the containers.

Figure 4:
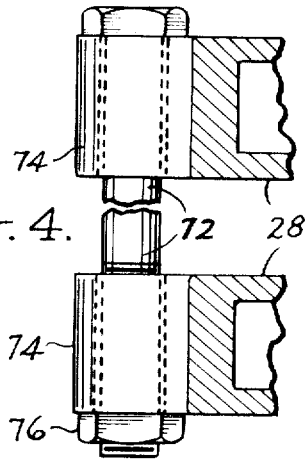
FIG. 4 is a foreshortened fragmentary sectional view similar to FIG. 3 showing a second form of shelf supporting means.
Figure 2:
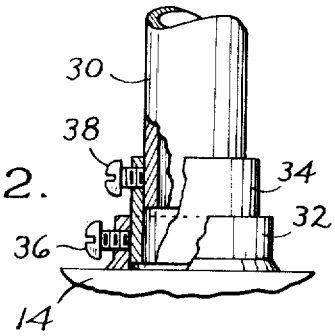
FIG. 2 is a fragmentary sectional view taken on the line 2—2 of FIG. 1.

In the modified structure illustrated in FIG. 4 the slotted links 62 previously described are replaced by threaded bolts 72 which extend freely through apertured tabs 74 on the sides of the plates. By adjusting the nuts 76 on the bolts the spacing between shelves may be varied, as desired. It will be understood that the bolts and tabs are offset in the manner of the links 62, as previously explained.

Figure 5:
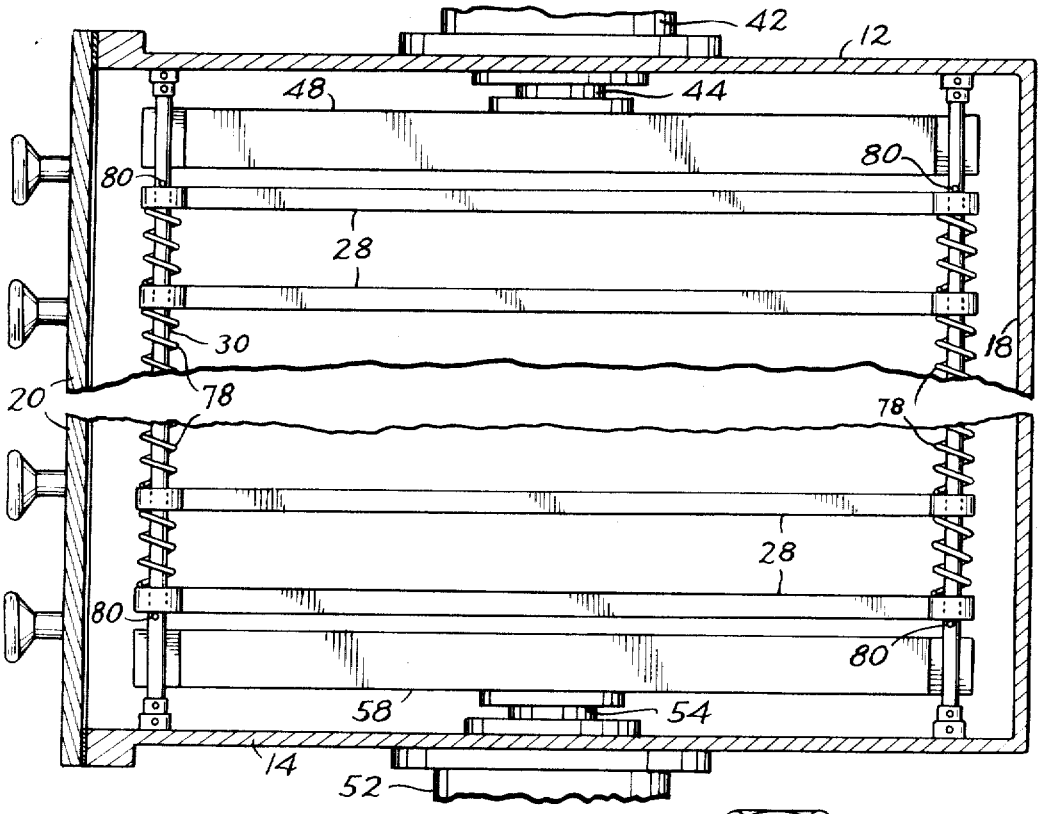
FIG. 5 is a foreshortened fragmentary view in side elevation, partly in section, showing still another form of shelf support mechanism.
Figure 3:
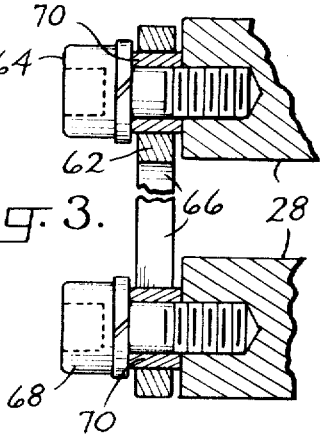
FIG. 3 is a foreshortened fragmentary sectional view taken on the line 3—3 in FIG. 1.

In the modified structure illustrated in FIG. 5 the slotted links 62 or bolts 72 previously described are replaced by coil springs 78 which encircle the guide rods 30 between adjacent shelves. The springs thus serve to space the shelves apart for loading and unloading, while permitting the shelves to be moved toward each other resiliently as the pressure plates move inward during the stoppering operation. Radially projecting pins 80 on the guide rods under the lowermost shelf and above the uppermost shelf may be provided for limiting the outward movement of the shelves. The assembly of shelves and guide rods thus forms an integral unit. The upper shelf need not be secured to the upper pressure plate, as distinguished from the embodiment first described.

It will be understood that the container stoppering apparatus described hereinbefore may incorporate therewith conventional equipment by which freeze drying of the contents of the containers may be accomplished prior to stoppering. In such event the shelves may be formed as hollow structures for the circulation therethrough of heating and refrigerating fluids. Such an arrangement affords the advantage of performing the freeze drying and stoppering operations sequentially without having to transfer the containers from one apparatus to another.

It will be apparent to those skilled in the art that various changes in the size, shape, type and arrangement of parts described hereinbefore may be made as desired. For example, the hydraulic piston-cylinder units may be replaced by other forms of extensible power units such as screw jacks, rack and pinion assemblies, and others, operated manually or by electrical, fluid pressure or other suitable sources of power. The threaded connector bolts 72 in FIG. 4 may be replaced by non-adjustable, headed connector pins if adjustment of the spacing between shelves is not desired. These and other changes may be made without departing from the spirit of this invention.

Having now described our invention and the manner in which it may be used, we claim:

1. Apparatus for stoppering containers, comprising (a) a housing, (b) top and bottom extensible power units mounted on top and bottom, respectively, of the housing and each having a drive rod extending inwardly thereof for reciprocative movement toward and away from the opposite end of the housing.

(c) a pressure plate on the inner end of each drive rod, (d) a plurality of shelves within the housing between the top and bottom pressure plates, the top and bottom shelves being disposed for engagement by the pressure plates, and (e) support means interengaging the shelves for supporting the latter normally spaced apart vertically for deposit thereon of containers to be stoppered and for permitting vertical movement of the shelves relative to each other upon reciprocative movement of the drive rods, the support means comprising (1) a plurality of links having vertical slots therein, (2) link support means securing the upper ends of the links to the shelves, and (3) connecting means on the shelves slidably engaging the slots in the links supported from the next upper shelf whereby to support each shelf by the next upper shelf.

[2. Apparatus for stoppering containers, comprising (a) a housing, (b) a plurality of shelves in the housing normally spaced apart vertically for deposit thereon of containers to be stoppered, (c) extensible power means on at least one of the top and bottom ends of the housing having a drive rod extending inwardly thereof and reciprocative in the housing toward and away from the opposite end of the housing, the drive rod operatively engaging the shelf at the corresponding end of the housing, and (d) support means interengaging each shelf and a shelf above it for supporting the lower shelf of each interengaged pair by the upper shelf of the pair in said normally spaced-apart relationship of the shelves and for permitting vertical movement of the shelves relative to each other upon reciprocative movement of the drive rod.]

[3. The apparatus of claim 2 wherein the support means comprise (a) a plurality of links having vertical slots therein, (b) link support means securing one end of the links to the shelves, and (c) connecting means on the shelves slidably engaging the slots in the links supported by another shelf whereby to support each shelf by a shelf above it.]

[4. The apparatus of claim 2 wherein the support means comprise (a) a plurality of tabs projecting from the sides of the shelves and having vertical openings therethrough, (b) the openings in tabs on different pairs of shelves being arranged in axially aligned pairs and each pair of tabs and openings being spaced laterally from the next adjacent pair, and (c) an elongated connector member extending freely through each aligned pair of said openings.]

[5. The apparatus of claim 4 wherein each connector member comprises a threaded bolt, and an adjustable nut is mounted on each bolt for adjusting the spacing between the shelves of each pair.]

[6. The apparatus of claim 2 including a plurality of horizontally spaced vertical guide rods of uniform diameter throughout the lengths mounted in the housing and extending freely through vertically aligned openings in the shelves.]

[7. The apparatus of claim 2 wherein the extensible power means comprise top and bottom extensible power units each engaging the shelf at the corresponding end of the housing.]

8. Apparatus for stoppering containers comprising (a) a housing, (b) top and bottom extensible power units mounted on the top and bottom, respectively, of the housing and each having a drive rod extending inwardly thereof for reciprocative movement toward and away from the opposite end of the housing, (c) a pressure plate on the inner end of each drive rod, (d) a plurality of shelves within the housing between the top and bottom pressure plates, the top and bottom shelves being disposed for engagement by the pressure plates, (e) a plurality of horizontally spaced vertical guide rods of uniform diameter throughout their lengths mounted in the housing and extending freely through vertically aligned openings in the shelves, and (f) support means interengaging each adjacent pair of shelves for supporting each shelf by the next adjacent shelf in normally vertically spaced-apart relationship for deposit thereon of containers to be stoppered and for permitting vertical movement of the shelves relative to each other upon reciprocative movement of the drive rods, the support means comprising:

(1) a plurality of links having vertical slots therein, (2) link support means securing one end of the links to the shelves, (3) connecting means on the shelves slidably engaging the slots in the links supported from the next adjacent shelf whereby to support each shelf by the next upper shelf, and (4) means securing the top shelf to the top pressure plate.

9. Apparatus for stoppering containers comprising (a) a housing, (b) top and bottom extensible power units mounted on the top and bottom, respectively, of the housing and each having a drive rod extending inwardly thereof for reciprocative movement toward and away from the opposite end of the housing, (c) a pressure plate on the inner end of each drive rod, (d) a plurality of shelves within the housing between the top and bottom pressure plates, the top and bottom shelves being disposed for engagement by the pressure plates, (e) a plurality of horizontally spaced vertical guide rods of uniform diameter throughout their lengths mounted in the housing and extending freely through vertically aligned openings in the shelves, and (f) support means interengaging each adjacent pair of shelves for supporting each shelf by the next adjacent shelf in normally vertically spaced apart relationship for deposit thereon of containers to be stoppered and for permitting vertical movement of the shelves relative to each other upon reciprocative movement of the drive rods, the support means comprising (1) a plurality of tabs projecting from the sides of the shelves and having vertical openings therethrough, (2) the openings in tabs on adjacent shelves being arranged in axially aligned pairs and each pair of tabs and openings being spaced laterally from the next adjacent pair, and (3) an elongated connector member extending freely through each aligned pair of said openings.

10. The apparatus of claim 9 wherein each connector member comprises a threaded bolt, and an adjustable nut is mounted on each bolt for adjusting the spacing between adjacent shelves.

*11. Apparatus for stoppering containers, comprising*

*(a) a housing,*

*(b) a plurality of shelves in the housing normally spaced apart vertically for deposit thereon of containers to be stoppered,*

*(c) top and bottom extensible power units on the top and bottom, respectively, of the housing and each having a drive rod extending inwardly thereof and reciprocative in the housing toward and away from the opposite end of the housing, each drive rod operatively engaging the shelf at the corresponding end of the housing, and*

*(d) support means interengaging each shelf and a shelf above it for supporting the lower shelf of each interengaged pair by the upper shelf of the pair in said normally spaced-apart relationship of the shelves and for permitting vertical movement of the shelves relative to each other upon reciprocative movement of the drive rods.*

*12. Apparatus for pressing material together, comprising*

*(a) a housing,*

*(b) a plurality of shelves in the housing normally spaced apart vertically for deposit thereon of material to be pressed together,*

*(c) top and bottom extensible power units on the top and bottom, respectively, of the housing and each having a drive rod extending inwardly thereof for reciprocative movement toward and away from the opposite end of the housing, each drive rod operatively engaging the shelf at the corresponding end of the housing, and*

*(d) support means interengaging each shelf and a shelf above it for supporting the lower shelf of each interengaged pair by the upper shelf of the pair in said*

*normally spaced-apart relationship of the shelves and for permitting vertical movement of the shelves relative to each other upon reciprocative movement of the drive rods.*

*13. Apparatus for pressing material together, comprising*

(*a*) a housing, (*b*) *a plurality of shelves in the housing normally spaced apart vertically for deposit thereon of material to be pressed together,*

(*c*) *extensible power means on at least one of the top and bottom ends of the housing having a drive rod extending inwardly thereof and reciprocative in the housing toward and away from the opposite end of the housing, the drive rod operatively engaging the shelf at the corresponding end of the housing, and*

(*d*) *support means interengaging each shelf and a shelf above it for supporting the lower shelf of each interengaged pair by the upper shelf of the pair in said normally spaced-apart relationship of the shelves and for permitting vertical movement of the shelves relative to each other upon reciprocative movement of the drive rod, the support means comprising*

(*1*) *a plurality of tabs projecting laterally from the sides of the shelves and having vertical openings therethrough,*

(*2*) *the openings in tabs on different pairs of shelves being arranged in vertically aligned pairs and each pair of tabs and openings being spaced apart laterally from the next adjacent pair, and*

(*3*) *an elongated threaded bolt extending freely through each aligned pair of said openings and an adjustable nut mounted on each bolt for adjusting the spacing between the shelves of each pair, the lateral spacings of the pairs of tabs and associated bolts thereby accommodating unobstructed movement of adjacent shelves into abutment with each other, and*

(*e*) *means communicating with the interior of the housing for providing said interior with a substantially evacuated or inert atmosphere.*

References Cited

The following references, cited by the Examiner, are of record in the patented file of this patent or the original patent.

UNITED STATES PATENTS

| | | | |
|---|---|---|---|
| 329,551 | 11/1885 | Hamilton | 100—194 X |
| 784,259 | 3/1905 | French | 100—194 |
| 1,113,297 | 10/1914 | Bernauer | 100—194 |
| 1,854,341 | 4/1932 | Laussucq | 100—195 U X |
| 2,094,862 | 10/1937 | Welch | 100—194 X |
| 2,142,581 | 1/1939 | Winegar | 100—195 |
| 3,005,402 | 10/1961 | Starger et al. | 100—194 X |
| 3,022,619 | 2/1962 | Strong et al. | 53—106 |
| 3,448,556 | 6/1969 | Taggart | 53—112 X |
| 2,792,678 | 5/1957 | Baldwin et al. | 53—101 |
| 3,286,366 | 11/1966 | Seligman | 53—102 X |
| 3,451,189 | 6/1969 | Taggart | 53—102 X |

ROBERT L. SPRUILL, Primary Examiner

H. M. CULVER, Assistant Examiner

U.S. Cl. X.R.

53—264, 319; 100—194